United States Patent
Hu

(10) Patent No.: US 8,222,950 B2
(45) Date of Patent: Jul. 17, 2012

(54) TEMPERATURE SENSOR OF A CPU AND PWM CONTROLLER THEREOF

(75) Inventor: Ke-You Hu, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 264 days.

(21) Appl. No.: 12/612,481

(22) Filed: Nov. 4, 2009

(65) Prior Publication Data

US 2011/0050193 A1   Mar. 3, 2011

(30) Foreign Application Priority Data

Sep. 2, 2009   (CN) ...................... 2009 2 0309459 U

(51) Int. Cl.
| | |
|---|---|
| H01L 35/00 | (2006.01) |
| H03K 17/14 | (2006.01) |
| G01K 7/00  | (2006.01) |
| G05F 1/10  | (2006.01) |
| G06F 1/32  | (2006.01) |

(52) U.S. Cl. ........ 327/512; 374/184; 374/185; 327/538; 327/378; 713/320

(58) Field of Classification Search .................. 324/721; 374/170–173, 185–184, 141; 327/512, 538, 327/378; 702/130–136; 713/320
See application file for complete search history.

(56) References Cited

U.S. PATENT DOCUMENTS

| | | | | |
|---|---|---|---|---|
| 7,211,977 B2 * | 5/2007 | Squibb | ...................... | 318/400.08 |
| 7,259,686 B2 * | 8/2007 | Hollander et al. | ............ | 340/652 |
| 7,323,837 B2 * | 1/2008 | Wang | ...................... | 318/268 |
| 7,343,503 B2 * | 3/2008 | Huang | ........................... | 713/320 |
| 7,874,724 B2 * | 1/2011 | Okoren et al. | .................. | 374/54 |
| 8,008,892 B2 * | 8/2011 | Kikuchi | ....................... | 320/134 |
| 2002/0140446 A1 * | 10/2002 | Kung | ............................ | 324/760 |

* cited by examiner

*Primary Examiner* — Gary L Laxton
*Assistant Examiner* — Zekre Tsehaye
(74) *Attorney, Agent, or Firm* — Altis Law Group, Inc.

(57) ABSTRACT

A power supply circuit includes a PWM controller, which is capable of providing pulse signals to the CPU, a temperature feedback circuit coupled to the PWM controller, and a temperature sensor. The temperature sensor is coupled to the temperature feedback circuit, the temperature sensor is located adjacent the CPU, and capable of detects a temperature of the CPU. The PWM controller is capable of adjusting the pulse signals to maintain the pulse signals stably when the temperature sensor detects the temperature of the CPU rising.

8 Claims, 3 Drawing Sheets

TEMPERATURE SENSOR OF A CPU AND PWM CONTROLLER THEREOF

BACKGROUND

1. Technical Field

The present disclosure relates to power supply circuits, and particularly to a power supply circuit for providing power to a CPU (central processing unit).

2. Description of Related Art

With the rapid development of personal computers, development of high performance components for computers have brought about a corresponding increase in power use. A CPU has a crucial effect on the stability of the computer. A power supply circuit is specially designed for providing power to the CPU.

Referring to FIG. 1, a typical power supply circuit for a CPU, according to the prior art, includes a PWM (pulse-width modulation) controller 90 which provides three pulse signals. The three pulse signals have different phases, such as phase 1, phase 2, and phase 3. Each of the three pulse signals controls a corresponding switch on or off on different time to provide multiphase power source to the CPU. The multiphase power source usually generates less heat than single phase power source, so the CPU can run more stable. However, the pulse signals are easily interfered with and generate disorder jitters which cause the power provided to the CPU to be unstable and result in the CPU generating a an excess of heat.

Therefore, there is room for improvement within the art.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
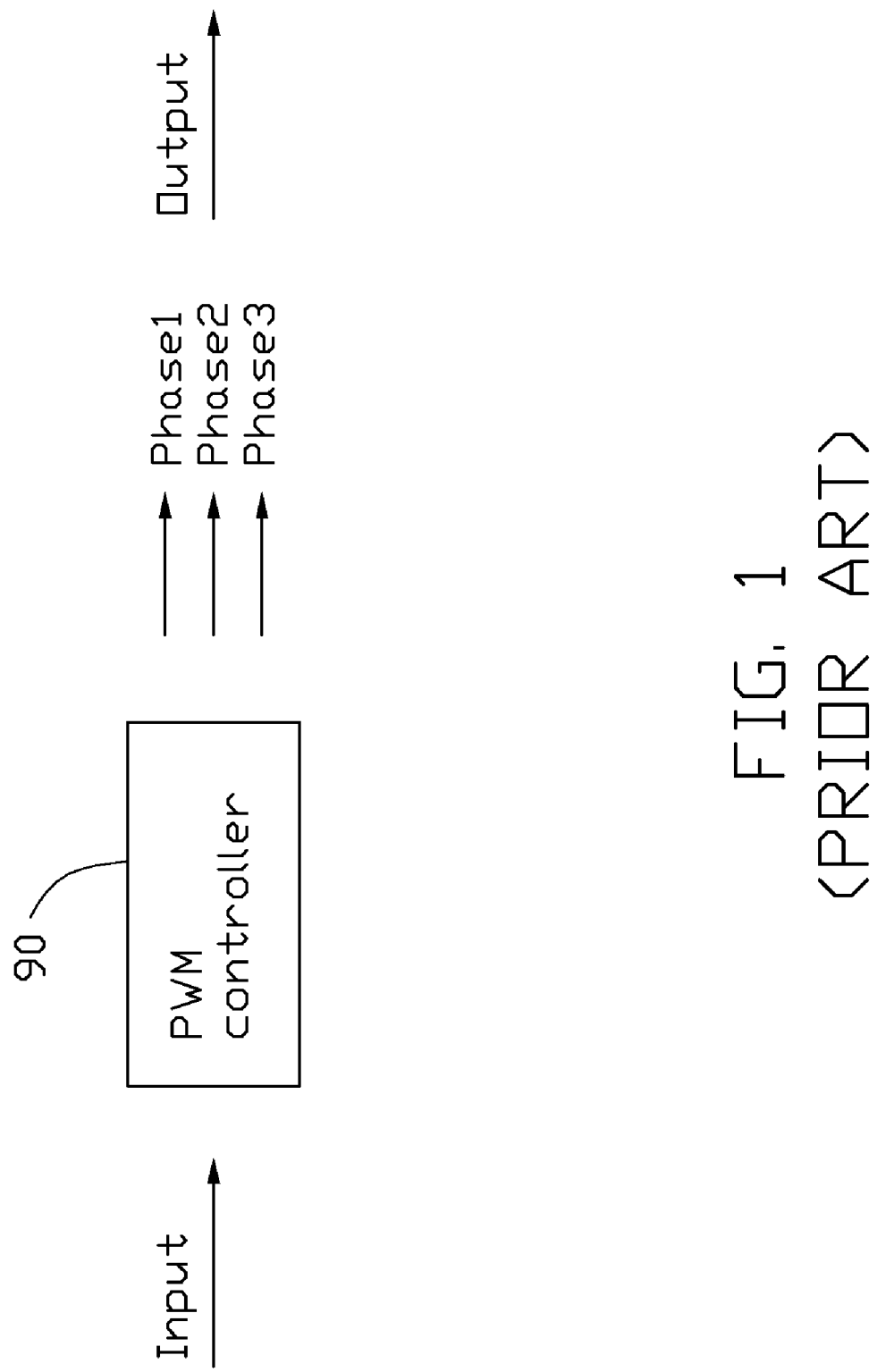
FIG. 1 is a block view of a conventional power supply circuit for a CPU, according to the prior art.
Figure 2:
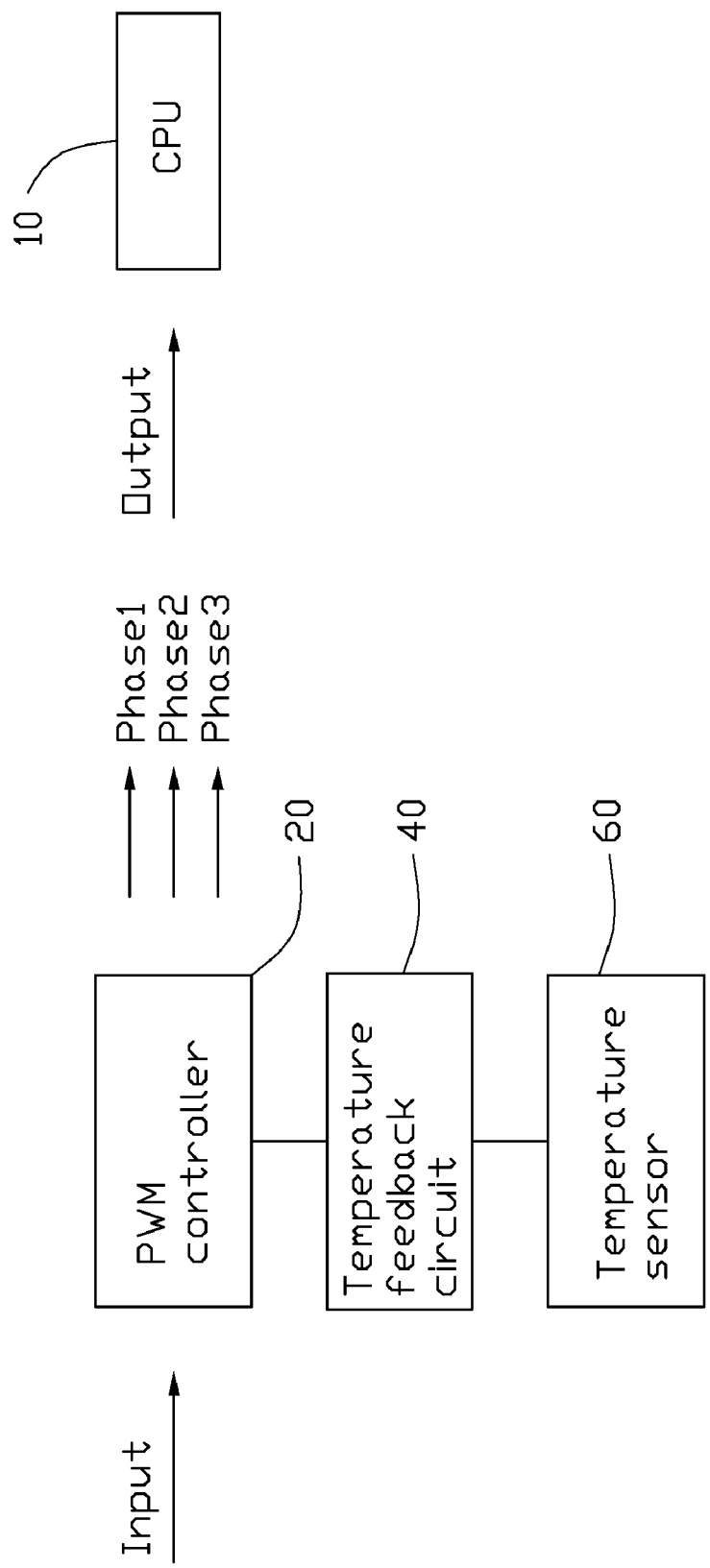
FIG. 2 is a block view of an embodiment of a power supply circuit for a CPU.

Referring to FIG. 2, a power supply circuit in an embodiment for providing power to a CPU 10, includes a PWM controller 20, a temperature feedback circuit 40, and a temperature sensor 60. The temperature feedback circuit 40 is connected to the PWM controller 20. The temperature sensor 60 is connected to the temperature feedback circuit 40. The temperature sensor 60 is capable of detecting a current temperature of the CPU 10, and generating a current temperature signal that is sent to the temperature feedback circuit 40.

Figure 3:
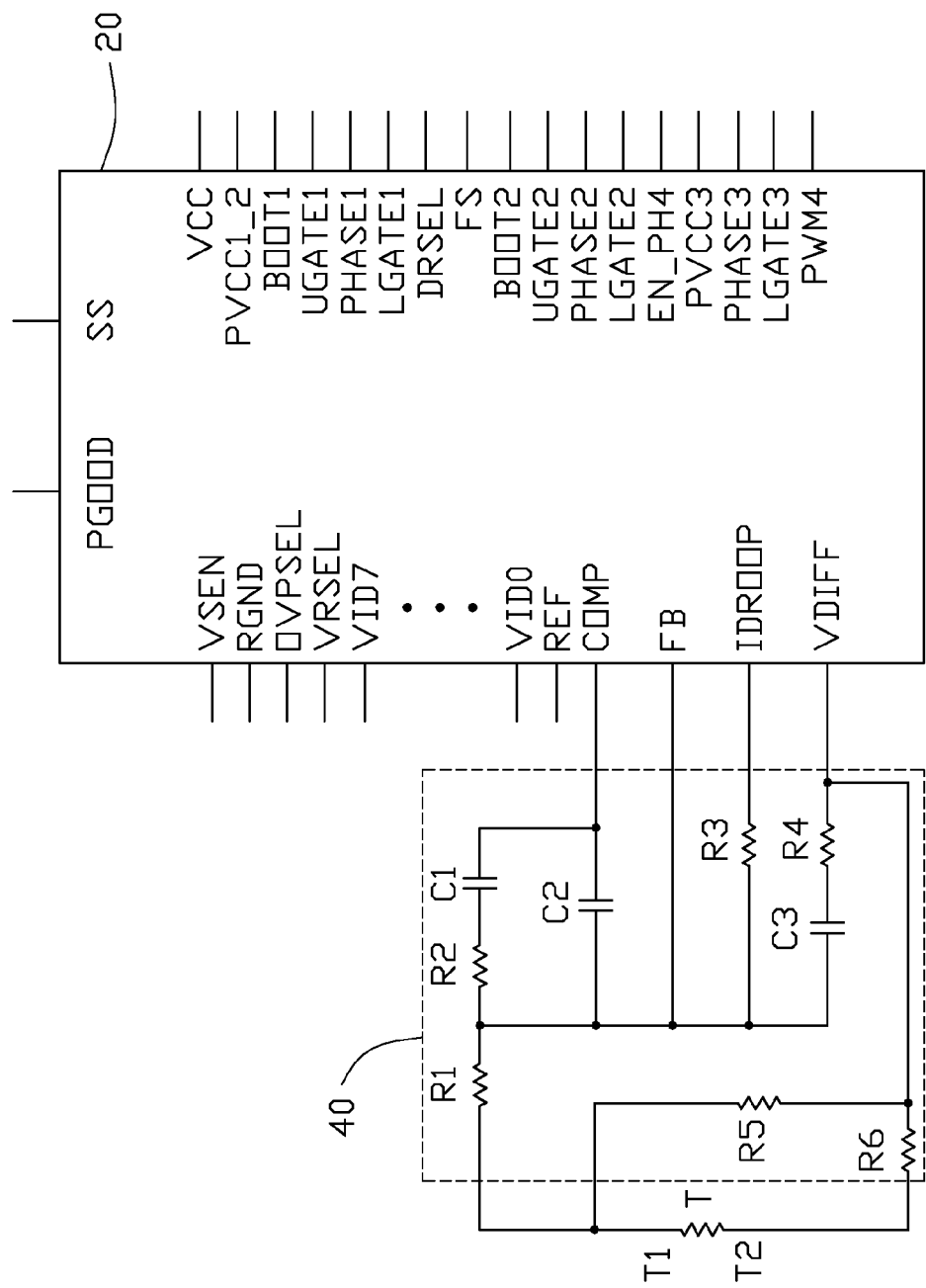
FIG. 3 is a circuit view of the power supply circuit of FIG. 2.

Referring to FIG. 3, the PWM controller 20 includes a plurality of pins, such as pin COMP, pin FB, pin IDROOP, pin VDIFF, pin PHSAE1, pin PHSAE2, pin PHSAE3, and so on. The pin COMP is used to trigger the PWM controller 20 to adjust the pulse signals outputted at the pins PHASE1, PHASE2, and PHASE3 according to the current temperature of the CPU 10.

The temperature feedback circuit 40 includes a first resistor R1, a second resistor R2, a third resistor R3, a fourth resistor R4, a fifth resistor R5, a sixth resistor R6, a first capacitor C1, a second capacitor C2, and a third capacitor C3.

The temperature sensor 60 can be a minus temperature coefficient thermal resistor T. The thermal resistor T is located adjacent the CPU 10 to measure the current temperature of the CPU 10. The thermal resistor T includes a first end T1 and a second end T2. The first end T1 of the thermal resistor T is connected to a first end of the first resistor R1. A second end of the first resistor R1 is connected to the pin COMP of the PWM controller 20 via a RC circuit. The RC circuit is composed of the second resistor R2 and the first capacitor C1. The second capacitor C2 is connected in parallel with the RC circuit and between the first resistor R1 and the pin COMP. The second end of the first resistor R1 is connected to the pin FB directly and further connected to the pin IDROOP via the third resistor R3. The second end of the first resistor R1 is connected to the pin VDIFF via the third capacitor C3 and the fourth resistor R4. The third capacitor C3 and the fourth resistor R4 are connected in series. The first end T1 of the thermal resistor T is connected to the pin VDIFF via the fifth resistor R5. The second end T2 of the thermal resistor T is connected to the pin VDIFF via the sixth resistor R6.

In operation, when the thermal resistor T detects that the temperature of the CPU rises, a resistor value of the thermal resistor T decreases. A voltage on the thermal resistor T decreases, and a voltage on the pin COMP rises. The PWM controller 20 then adjusts the pulse signals outputted by the pins PHASE1, PHASE2, and PHASE3 to maintain the pulse signals stably.

It is to be understood, however, that even though numerous characteristics and advantages of the embodiments have been set forth in the foregoing description, together with details of the structure and function of the embodiments, the disclosure is illustrative only, and changes may be made in detail, especially in matters of shape, size, and arrangement of parts within the principles of the present disclosure to the full extent indicated by the broad general meaning of the terms in which the appended claims are expressed.

What is claimed is:

1. A power supply circuit, comprising:
   a PWM controller which is capable of providing pulse signals to a CPU;
   a temperature feedback circuit is coupled to the PWM controller; and
   a temperature sensor coupled to the temperature feedback circuit; the temperature sensor is located adjacent the CPU and capable of detecting a temperature of the CPU, wherein the temperature sensor comprises a first end and a second end, the temperature feedback circuit comprises a first resistor, a RC circuit which comprises a RC resistor and a RC capacitor, and a sixth resistor, the PWM controller comprises a first controller pin and a second controller pin, the first end of the temperature sensor is serially connected to the first resistor, the RC resistor, and the first controller pin, and the second end of the temperature sensor is connected to the second controller pin via the sixth resistor;
   wherein the PWM controller is capable of adjusting the pulse signals depending on the temperature sensor.

2. The power supply circuit of claim 1, wherein the temperature sensor is a minus temperature coefficient thermal resistor.

3. The power supply circuit of claim 1, wherein a second capacitor is connected in parallel with the RC circuit between the first resistor and the first controller pin of the PWM controller.

4. The power supply circuit of claim 1, wherein the temperature sensor is capable of detecting a rise in the temperature of the CPU; when the rise in temperature is detected, a resistor value of the temperature sensor is decreased to cause a voltage on the temperature sensor to decrease, and a voltage on the first controller pin rises and triggers the PWM controller to adjust the pulse signals.

5. A power supply circuit, comprising:
- a PWM controller which is capable of providing pulse signals to a CPU, the PWM controller comprises a second controller pin and a first controller pin capable of triggering the PWM controller to adjust pulse signals when a voltage on the first controller pin varies; and
- a temperature sensor comprising a first end and a second end, the first end is coupled to the first controller pin via a first resistor and a RC circuit in series, the second end is coupled to the second controller pin via a sixth resistor, the temperature sensor is located adjacent the CPU, and capable of detecting a temperature of the CPU and vary a resistor value of the temperature sensor to control voltages on the temperature sensor and the controller pin.

6. The power supply circuit of claim 5, wherein the temperature sensor is a minus temperature coefficient thermal resistor.

7. The power supply circuit of claim 5, wherein a second capacitor is connected in parallel with the RC circuit between the first resistor and the first controller pin of the PWM controller.

8. The power supply circuit of claim 5, wherein the temperature sensor is capable of detecting a rise in the temperature of the CPU when the rise in temperature is detected, a resistor value of the temperature sensor is decreased to cause a voltage on the temperature sensor to decrease, and a voltage on the first controller pin rises and triggers the PWM controller to adjust the pulse signals.

* * * * *